May 2, 1961
B. PELLATON
2,982,325
ANTI-SLIP ELEMENT FOR VEHICLE TIRES
Filed Dec. 14, 1959
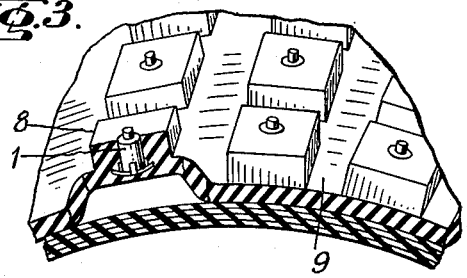
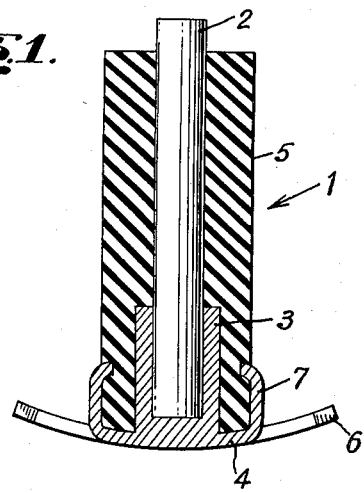
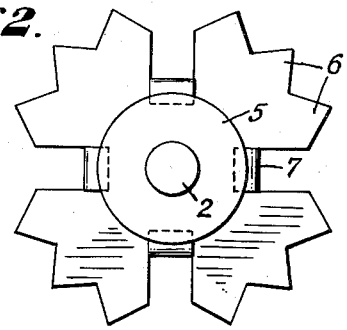
INVENTOR
BENJAMIN PELLATON

2,982,325
ANTI-SLIP ELEMENT FOR VEHICLE TIRES

Benjamin Pellaton, Hilterfingen, Switzerland, assignor to Wermex A.G., Nidau, Switzerland, a corporation of Switzerland Filed Dec. 14, 1959, Ser. No. 859,271

2 Claims. (Cl. 152—210)

The present invention relates to an anti-slip element for vehicle tires, especially pneumatic tires, having a gripper. In the case of a vehicle tire equipped with a number of such elements, the grippers increase the grip quality of the tread and thus the coefficient of friction characteristic in each case of the frictional pairing of tire and road surface. Thus the occurrence of sliding friction in the said frictional pairing and thus the skidding of the vehicle can largely be prevented. This is of outstanding and even often of life and death importance in the case of slippery or smooth-frozen road surfaces. Naturally the increase of the adhesion of the tire on the road surface also has a favorable effect upon the transmission of the drive force to the road, and renders movement possible even when vehicles equipped with normal tires entirely lose their capacity for travel.

The efficiency of the anti-slip elements and their durability are very largely dependent upon the retention of the gripper. In order to offer an optimum in this respect, the anti-slip element according to the invention is distinguished in that the gripper is embedded in a jacketing of rubber or a rubber-like material. In a preferred form of embodiment the gripper is constructed in the form of a small, cylindrical rod, which is secured in an anchor member.

An example of embodiment of the object of the invention is illustrated in the accompanying drawing, wherein Figures 1 and 2 show the anti-slip element in axial section and plan view respectively, and Figure 3 shows a portion of the tread of a pneumatic tire.

In the drawing, according to Figure 1 the anti-slip element 1 possesses a gripper 2, which consists of hard metal and is constructed in the form of a cylindrical small rod. The gripper rod 2 is inserted with press fit into a cylindrical sleeve 3 closed at one end, which carries on its closed end a plate 4 concave in relation to itself, and with this forms an anchor member. A jacketing 5 of rubber, or of a material with similar properties, surrounds the gripper rod 2 and the sleeve 3, and extends as far as the plate 4. The free end of the gripper rod 2 however projects out of the jacketing 5. A total of four claws 7 are cut crosswise out of the plate 4, the edge of which is provided with teeth 6, and these claws are bent up, their points gripping and holding fast the jacketing 5. The tooth points of the plate 4 preferably lie on a circle.

Figure 3 shows how the anti-slip elements 1 are inserted in a tire, for example in the studs 8 of a snow tire. The plate 4 and more especially the teeth 6 thereof grip beneath the tread material, and thereby impart a secure hold to the anti-slip element 1. The jacketing 5 is in close contact with the tread material, so that a satisfactory lateral guidance is given for the gripper rod 2. This prevents bending or even breaking off of the gripper. If the suitable kind of hard metal is correctly selected, the gripper rods 2 are always worn away to the same extent as the whole of the tread of the tire. It is worthy of note that damage to the fabric of the tire or even to the tube is precluded, since the plate 4 possesses a sufficiently large supporting surface to prevent the element from being pressed in against the fabric.

The gripper rod 2 is seated in a blind hole of the anchor member, and thus cannot be pressed alone inwards.

The anti-slip elements can be inserted into the tire in the production thereof, or may also be inserted subsequently.

The sleeve 3 does not necessarily have to be produced in one piece with the plate 4.

What I claim is:

1. An anti-slip element for rubber tires, comprising a gripper element having one end thereof flat and being of a hard material, a sleeve into which the other end of said gripper element is secured, a base plate on the end of said sleeve having a diameter substantially greater than that of said gripper element, a jacket of resilient material closely engaging around said sleeve and substantially all of said gripper element which projects from said sleeve, with the flat end of said gripper element projecting from said jacket, and said base plate having claws bent up out of it substantially perpendicular thereto and into said jacket, the remaining portion of said base plate being slightly dished toward said sleeve and having points in the peripheral edge thereof.

2. In combination, an anti-slip element comprising a gripper element having one end thereof flat and being of a hard material, a sleeve into which the other end of said gripper element is secured, a base plate on the end of said sleeve having a diameter substantially greater than that of said gripper element, a jacket of resilient material closely engaging around said sleeve and substantially all of said gripper element which projects from said sleeve, with the flat end of said gripper element projecting from said jacket, and said base plate having claws bent up out of it substantially perpendicular thereto and into said jacket, the remaining portion of said base plate being slightly dished toward said sleeve and having points in the peripheral edge thereof, and a rubber tire tread, said anti-slip element being embedded in said tread with the end of said jacket toward the flat end of said gripper element level with the tread surface, and said base plate being embedded in the body of said tread.

References Cited in the file of this patent
FOREIGN PATENTS

| | | |
|---|---|---|
| 13,905 | Great Britain | 1915 |
| 319,826 | Switzerland | Apr. 15, 1957 |